United States Patent [19]
Kondo

[11] Patent Number: 6,162,020
[45] Date of Patent: Dec. 19, 2000

[54] AIRLIFT PUMP APPARATUS AND METHOD

[75] Inventor: Masao Kondo, Cary, N.C.

[73] Assignee: NCA2BioProcess, Inc., Raleigh, N.C.

[21] Appl. No.: 09/205,591

[22] Filed: Dec. 4, 1998

[51] Int. Cl.[7] .................................................. F04F 19/24
[52] U.S. Cl. ............................................................. 417/54
[58] Field of Search .............................. 417/54, 108, 109, 417/116, 90; 210/150, 257.1, 262, 532.2

[56] References Cited

U.S. PATENT DOCUMENTS

| | | | |
|---|---|---|---|
| 2,399,634 | 5/1946 | Holland et al. | 417/108 X |
| 3,289,609 | 12/1966 | Palo | 417/108 X |
| 5,030,353 | 7/1991 | Stuth | 210/615 |
| 5,312,232 | 5/1994 | Horton et al. | 417/108 |
| 5,609,754 | 3/1997 | Stuth | 210/333.01 |
| 5,674,399 | 10/1997 | Davis | 210/615 |
| 5,690,824 | 11/1997 | Stuth | 210/151 |

OTHER PUBLICATIONS

Waterloo Biofilter Systems, "Communal–size sewage and leachate treatment using biofilters in process trains," Enviornmental Science & Engineering, (Jan. 30, 1998).

A.H. Stenning, C.B. Martin, "An Analytical and Experimental Study of Air–Lift Pump Peformance," Transactions of the ASME, (Apr. 30, 1968).

A. Tramba et al., "Visual Study of an Airlift Pump Operating at Low Submergence Ratios," Canadian Journal of Chemical Engineering, (Oct. 30, 1995).

F.A. Zenz, "Explore the Potential of Air–Lift Pumps and Multiphase," Chemical Engineering Progress, (Aug. 30, 1993).

A. Nenes, D. Assimacopoulos, N. Markatos, E. Mitsoulis, "Simulation of Airlift Pumps for Deep Water Wells," Canadian Journal of Chemical Engineering, (Aug. 30, 1996).

Frank Yeaple, "Floating Airlift Pumps Saves Lake From Death," Design News, (May 5, 1986).

Nicholas P. Cheremisinoff, "Dynamics of Single–Fluid Flows and Mixing," Encyclopedia of Fluid Mechanics.

Ken Vargas, "Air–lift pump cleans around subsea wellhead," Oil & Gas Journal, (Aug. 3, 1992).

Primary Examiner—Henry C. Yuen
Attorney, Agent, or Firm—Olive & Olive, P.A.

[57] ABSTRACT

An airlift pump apparatus and method is based on the practice of injecting air intermittently into a vertical riser tube at a location above a bottom open end of the riser tube which is submerged in the liquid to be pumped. The intermittently injected air is used to create intermittent airlifts within the tube and cause aerated liquid to be discharged intermittently from an output port of the tube.

11 Claims, 5 Drawing Sheets

AIRLIFT PUMP APPARATUS AND METHOD

FIELD OF THE INVENTION

The invention generally relates to an airlift pumping apparatus and method for general application and is described in reference to an airlift pumping apparatus and method used for both pumping and aerating household wastewater discharged from a septic tank to a drainage field.

BACKGROUND OF THE INVENTION

A typical airlift pump, illustrated in FIG. 1, consists of an open ended vertical riser tube, partially submerged in a liquid and near the bottom of which compressed air or another gas is injected. Once the air or other gas is injected into the liquid, the average density of the air-liquid mixture in the riser tube becomes less than the density of the surrounding liquid. The resulting buoyant force causes a pumping action in the riser tube and the air-liquid mixture is discharged at the top of the riser tube.

Airlift pumps are widely applied for the purpose of pumping liquids. For example, an airlift pump is described in the article entitled "Airlift Pump Cleans Around Subsea Wellhead", *Oil and Gas Journal*, Volume 90, Aug. 3, 1992, pages 62–64. A lift pump operation is also explained in reference to FIGS. 45 and 46 in *Encyclopedia Of Fluid Mechanics, Volume 2, Dynamics of Single Fluid Flows and Mixing,* Nicholas P. Cheremisinoff, Editor.

In the article entitled "Simulation Of Airlift Pumps For Deep Water Wells", *The Canadian Journal Of Chemical Engineering*, Volume 74, August, 1996, pages 448–456, mention is made that airlift pumps offer simplicity of construction and lack of moving mechanical parts as their main advantages. This article also illustrates both external airline and internal airlift pump systems. In another article entitled "Explore The Potential Of Airlift Pumps And Multiphase", *Chemical Engineering Progress, August* 1993, pages 51–56, a discussion is given of the effect of liquid density on the operation of an airlift pump. A discussion of how the ratio of the length of submerged riser tube to the total riser tube length affects the airlift pump performance is found in the article entitled "Visual Study Of An Airlift Pump Operating At Low Submergence Ratios", *The Canadian Journal Of Chemical Engineering*, Volume 73, October, 1995. In a wastewater system marketed as the Nibbler, Jr.™ by Northwest Cascade-Stuth of 16207 Meridian, Puyallup, Wash. 98373, an airlift system is used to lift wastewater.

In the particular context of treatment of wastewater, it is recognized by the present invention that the typical airlift pump tends to aerate the liquid being pumped and that aeration of the wastewater could become an advantage when the wastewater is liquid being pumped from a septic tank to a drain field having a clay-like character which makes liquid that is not aerated difficult to absorb. Also recognized by the invention is the potential advantage of pumping wastewater to a drain field intermittently rather than constantly so as to permit the drain field to absorb intermittently and the drain field pipes to be flushed intermittently.

In the typical application of an airlift pump, the inflow to the tank, vessel or other body holding the liquid to be pumped and in which the riser tube is submerged, the air flow rate and the depth of submergence of the riser tube are all relatively constant and the airlift pump outflow is continous. So far as is known, an airlift pump has never been constructed such that without requiring moving parts or controls, it can be made to pump intermittently. While the conventional airlift pump construction and operation is well understood, what has not been recognized is that by making a significant modification of the conventional airlift pump construction as provided by the present invention, the airlift pump can be made to operate intermittently. It has been shown that the airlift pump of the present invention, under selected conditions, is significantly more efficient than traditional airlift pumps, providing for increased output flow rate.

The airlift pump of the present invention may be particularly suited for many applications, including subsea wellheads, water wells, and like applications. The particular application described in detail herein is for pumping and aerating household wastewater in septic tank systems, it being understood that the airlift pump so described is equally applicable to many different applications.

With the foregoing in mind, the object of the present invention becomes that of providing an improved airlift pump apparatus and method for general application.

A further object of the present invention is to provide an airlift pump apparatus that operates using reduced air supply power.

Another object of the present invention is to provide an airlift pump apparatus and method, wherein the discharged liquid is caused to be emitted in intermittent powerful bursts.

Yet another object of the present invention is to provide an airlift pump apparatus and method, wherein the rate of liquid output is increased compared to the rate of liquid output of a typical airlift pump.

Yet another object of the present invention is to provide an airlift pump apparatus and method that is suited to the needs of pumping wastewater from septic tanks to drain fields, wherein the liquid is pumped intermittently, but substantially evenly over the course of a day during which liquid input to the septic tank may vary substantially and is also pumped in a manner which causes the discharge water directed to the drain field to be highly and intermittently aerated and therefore more suitable for absorption by clay and other soils of like character.

Other objects will become apparent as the description proceeds.

SUMMARY OF THE INVENTION

An improved airlift pump apparatus and method of general application is illustrated, by way of example, as being applied to pumping wastewater (fluid) from a septic tank (reservoir of fluid) to a drain field (outlet end). The airlift pump apparatus of the invention as illustrated by way of example incorporates an inverted cylindrical chamber having a closed upper end, an open bottom end continuous within the fluid held with the septic tank, and a source of air connected to the closed upper end. This chamber effectively serves as an air tank and within the chamber there is mounted a vertical pipe of substantially less diameter than that of the chamber and having an open upper end located at an internal elevation within the chamber which is higher than the elevation of the open bottom end of the chamber. The vertical pipe connects through a horizontal run of pipe to a riser tube into which air accumulated in the air tank formed by the chamber is intermittently discharged whenever the water level in the air tank is forced down to the level of the horizontal run of pipe connecting the referred to vertical pipe and riser tube.

In operation, air accumulates in the air tank and forces liquid down within the air tank until it reaches the level of the horizontal run of pipe connecting the vertical pipe and riser tube at which stage a mixture of liquid and air is discharged as a powerful burst of aerated liquid from an upper output port of the riser tube. When applied to a septic tank system, the aerated water is typically directed to a drain-field associated with the septic tank. The system of the invention automatically recycles after each burst of aerated liquid.

DETAILED DESCRIPTION OF PREFERRED EMBODIMENTS OF THE INVENTION

Figure 1:
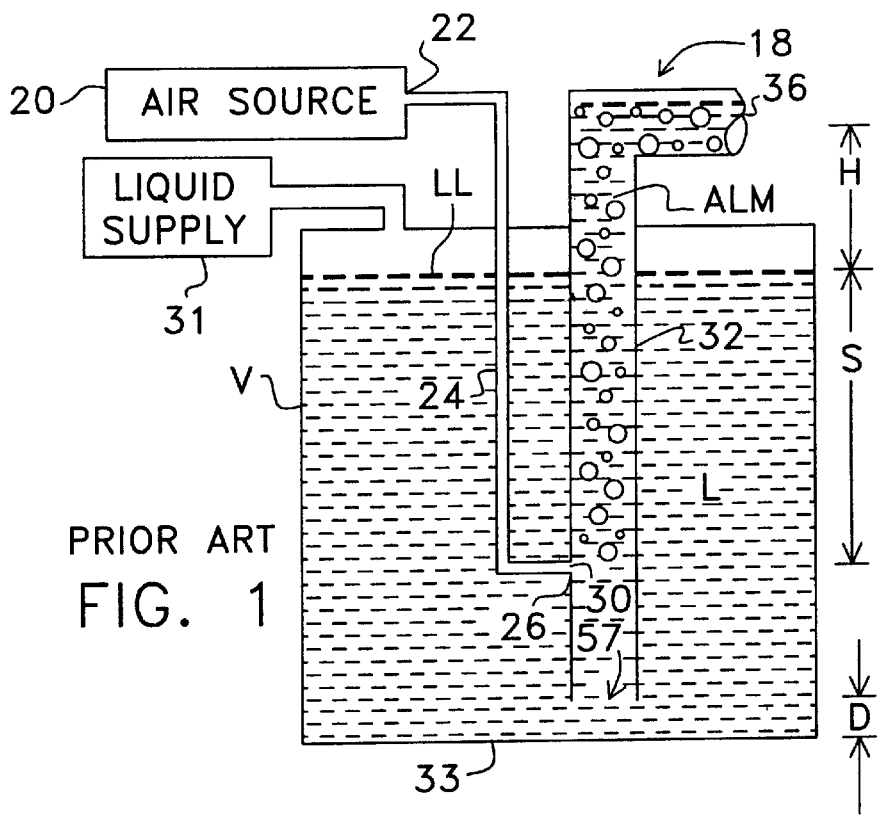
FIG. 1 is a schematic drawing of a conventional prior art airlift pump and illustrating how liquid can be lifted by the airlift effect.

In the typical airlift pump apparatus 18 as illustrated in FIG. 1, air is supplied from a compressed air source 20 connected to input end 22 of an air supply line 24 and whose output end 26 is connected through a port 30 to the lower end of a riser tube 32 with port 30 being submerged below liquid level LL to a depth S in the liquid L being pumped. The lower intake port 57 of riser tube 32 is maintained at a distance D above the bottom wall 33 of vessel V. The air flowing through the liquid L in the portion of the riser tube above the port 30 creates an air-liquid mix ALM which is less dense than the liquid L and thus tends to rise and is discharged through output port 36. Liquid L is transferred from liquid supply 31 to illustrative vessel V holding the liquid L. The flow of air through air supply line 24 and port 30 remains constant, and thus, using a typical airlift pump apparatus, the air-liquid mix ALM lifted by the head distance H and discharged through output port 36 is continuous, provided liquid level LL does not fall below port 30.

By contrast, the apparatus and method of the invention recognizes that for many applications including the application related to pumping wastewater from a septic tank to a drain field, advantages accrue when the airlift pump is made to operate intermittently. Furthermore, most all applications can benefit from the increased rate of liquid output from the airlift pump of the present invention. An increased rate of liquid output as provided by the present invention means that the power needed to pump a specified volume of air into the airlift pump of the invention for a specified liquid output is lower (when compared to a typical airlift pump), thereby lowering the size and cost of air pumps, which would be especially important in the context of massive airlift pumping applications, such as removal of liquid from the ocean floor or from deep wells. The manner in which this is accomplished is next described in reference to FIGS. 2–9, showing by way of example, the airlift pump of the present invention applied to a septic tank system.

In the description to follow, the vessel V of FIG. 1 may for reference be thought of as one portion of a septic tank and the liquid supply 31 as a supply of wastewater liquid L contained in another portion of the same septic tank. It will nevertheless be apparent that liquid supply 31 could be any suitable liquid supply such as a river or precipitation, and vessel V could be any reservoir for holding liquid, including a natural body of water such as a lake or ocean. Liquid supply 31 and vessel V could also constitute together a single source of liquid.

Figure 2:
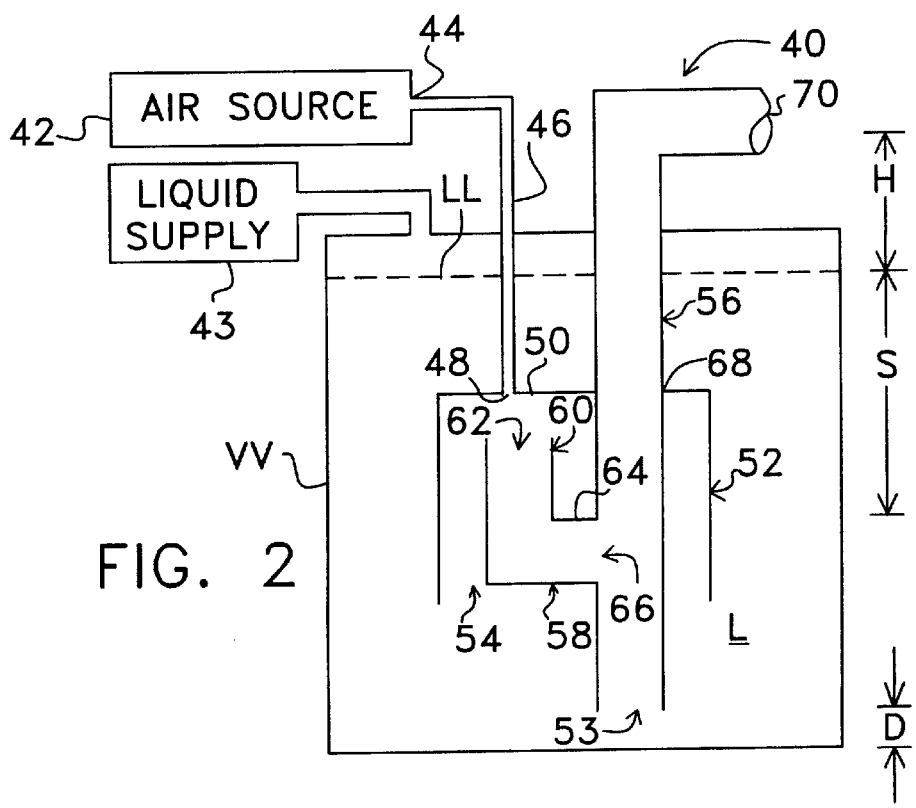
FIG. 2 is a schematic drawing of an improved airlift pump according to a first embodiment of the invention but with the liquid eliminated for purposes of illustration.
Figure 3:
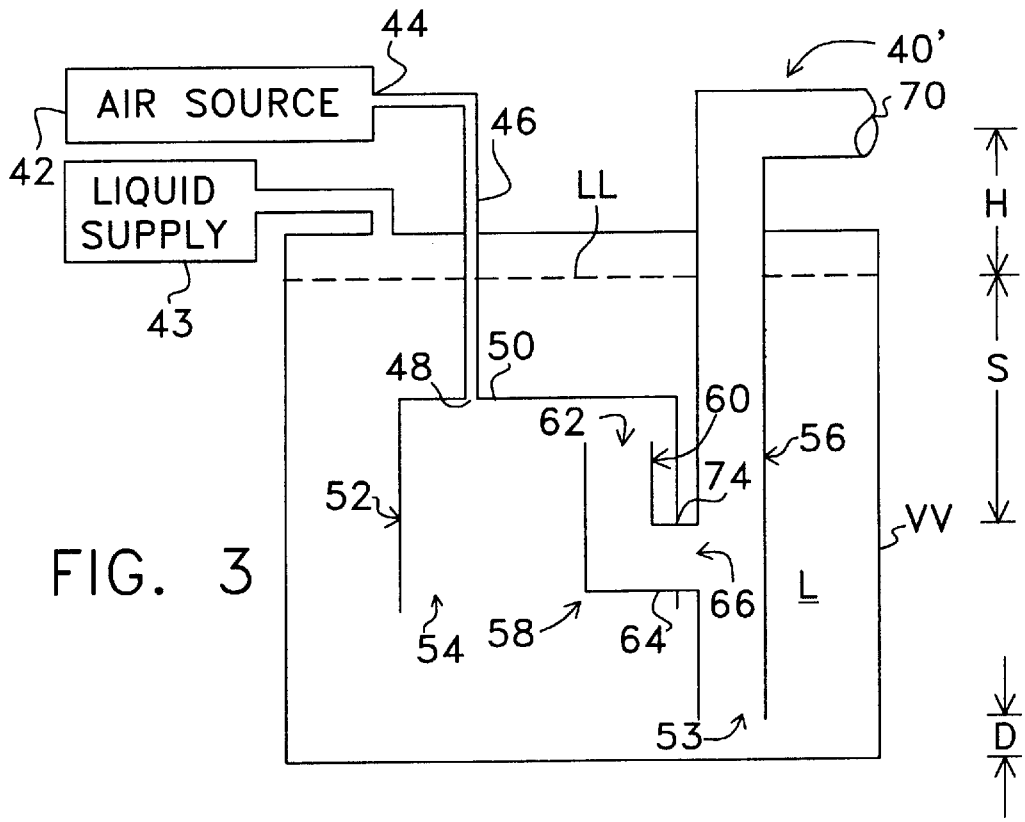
FIG. 3 is a schematic view of an improved airlift pump according to a second embodiment of the invention but without the liquid being illustrated.

Making reference initially to FIGS. 2–3, there is shown somewhat schematically in FIG. 2 a first embodiment and in FIG. 3 a second embodiment of a modified airlift pump apparatus according to the invention and characterized by exhibiting an intermittent operation. The liquid L and air-liquid mix ALM seen in FIG. 1 are not shown in FIGS. 2 and 3 for simplification. Referring further to FIG. 2, there is shown a modified airlift pump system 40 in which air is supplied from an air source 42 connected to input port 44 of an air supply line 46 and whose output port 48 is connected to the upper closed end 50 of what is referred to as an air tank 52. Air tank 52 has an upper closed end 50 and is illustrated as being of cylindrical construction with a bottom open end 54 continuous with liquid L.

Continuing in reference to FIG. 2, a cylindrical riser tube 56 is formed with a connected elbow 58 having an upper vertical intake end 60 with an intake port 62 and a lower horizontal discharge end 64 with a discharge port 66 connected to a lower intermittent portion of riser tube 56 the upper portion of which extends through a suitable relatively tight opening 68 in the upper closed end 50 of air tank 52. The airlift assembly comprising air tank 52 and riser tube 56 mounts in a suitable septic tank or other vessel VV connected to a liquid supply 43 and containing the wastewater liquid L to be pumped through intake port 53 of riser tube 56 in the manner described below for discharge through output port 70. Distances H, S and D in FIG. 2 represent distances of similar notation as seen in FIG. 1.

In a second embodiment illustrated in FIG. 3, the airlift pump apparatus 40' utilizes many of the same components as previously referred to and are identified in FIG. 3 by the same numerals and letter notation as used in FIG. 2. As will be readily seen by a comparison of FIG. 2 with that of FIG. 3, it will be seen that the riser tube 56 is mounted externally of air tank 52 and has the lower horizontal discharge end 64 of elbow 58 mounted through a relatively tight side wall opening 74 in air tank 52.

The invention apparatus lends itself to being formed in many different ways and sizes with each such form being capable of the intermittent operation described below. Simply by way of illustration, the air tank 52 in one example was formed of plastic tubing of approximately 4 inches internal diameter. In the same example, riser tube 56 and elbow 58 were formed of plastic tube of approximately 1-inch internal diameter. The relative height of the air tank 52 and length of riser tube 56 were generally as indicated in FIGS. 2 and 3.

Figure 4:
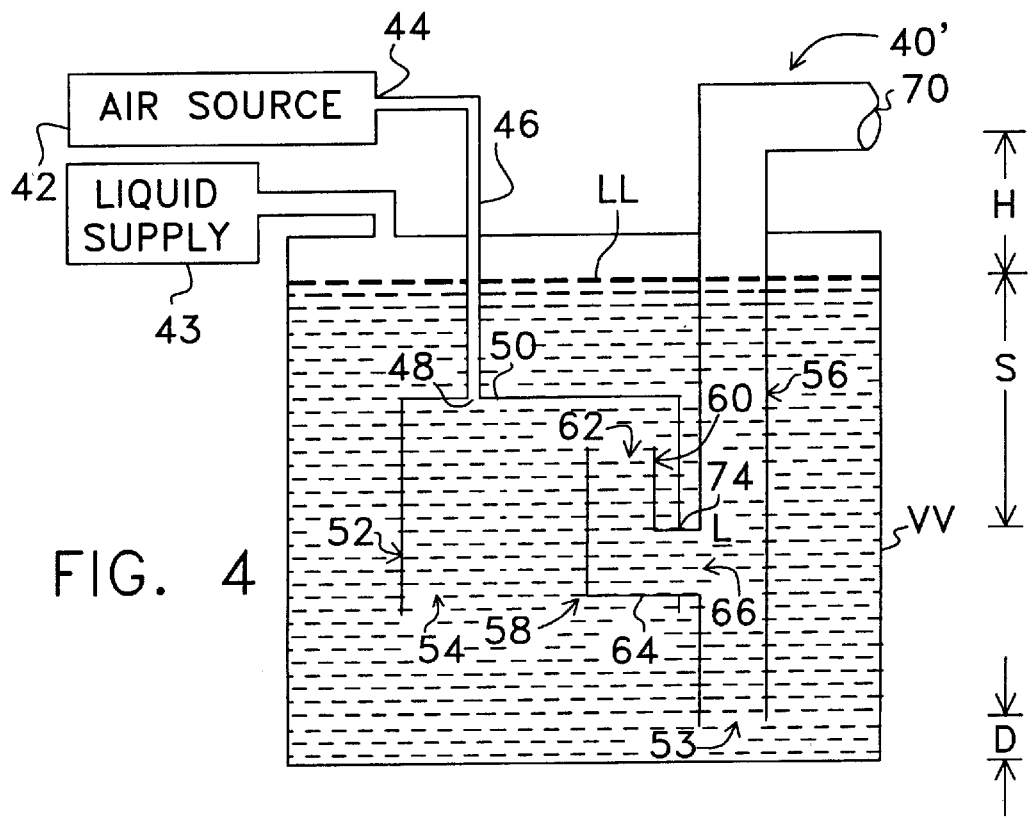
FIG. 4 is a schematic illustration of the beginning of a pump cycle utilizing the second embodiment of the airlift pump invention shown in FIG. 3.

With the above background in mind, the explanation next proceeds to FIGS. 4–8 and a description of the manner of operation in which the FIG. 3 second embodiment is used by way of reference. In this explanation, liquid L is assumed to be wastewater being pumped from a septic tank assumed to be vessel VV, to a drain field, not shown. At the beginning of a cycle of operation, FIG. 4 illustrates the airlift pump system 40' of FIG. 3 with the air tank 52, riser tube 56 including its elbow 58 with upper vertical end 60 and lower horizontal discharge end 64 all filled with the liquid L and with little or no air present in air tank 52.

Figure 5:
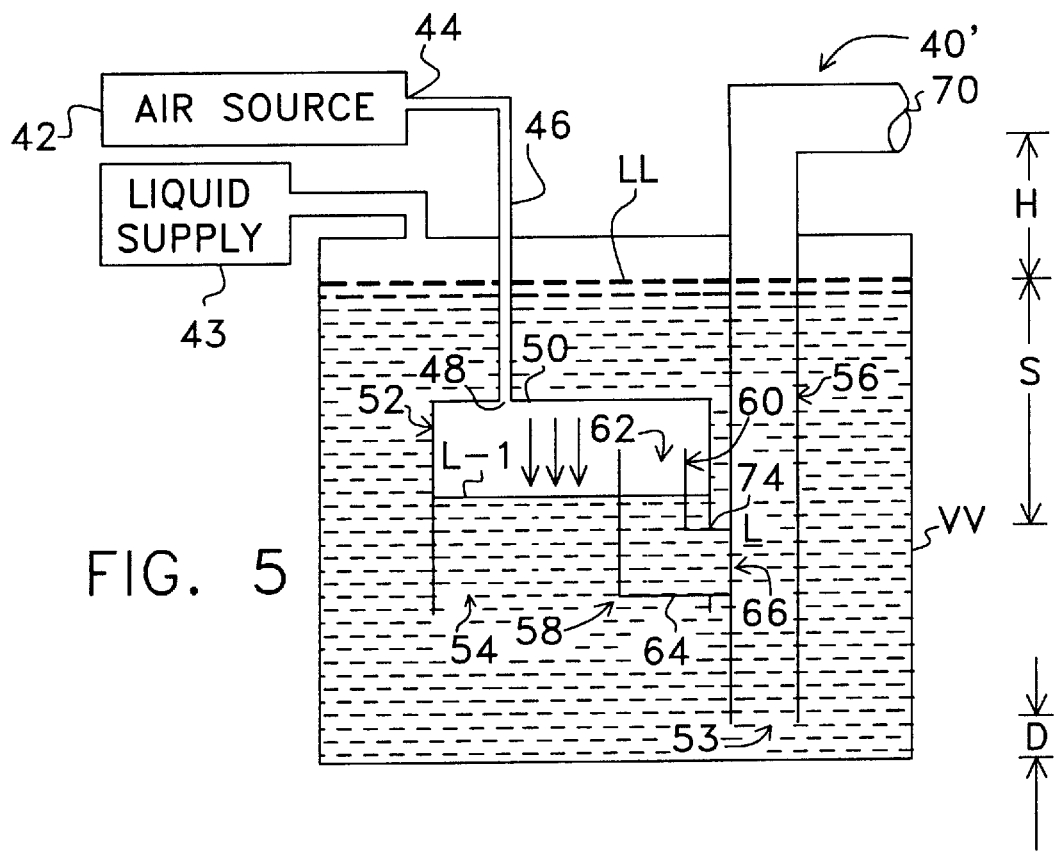
FIG. 5 is a schematic illustration of the beginning of the air storage portion of the pumping cycle utilizing the FIG. 3 airlift pump embodiment.
Figure 6:
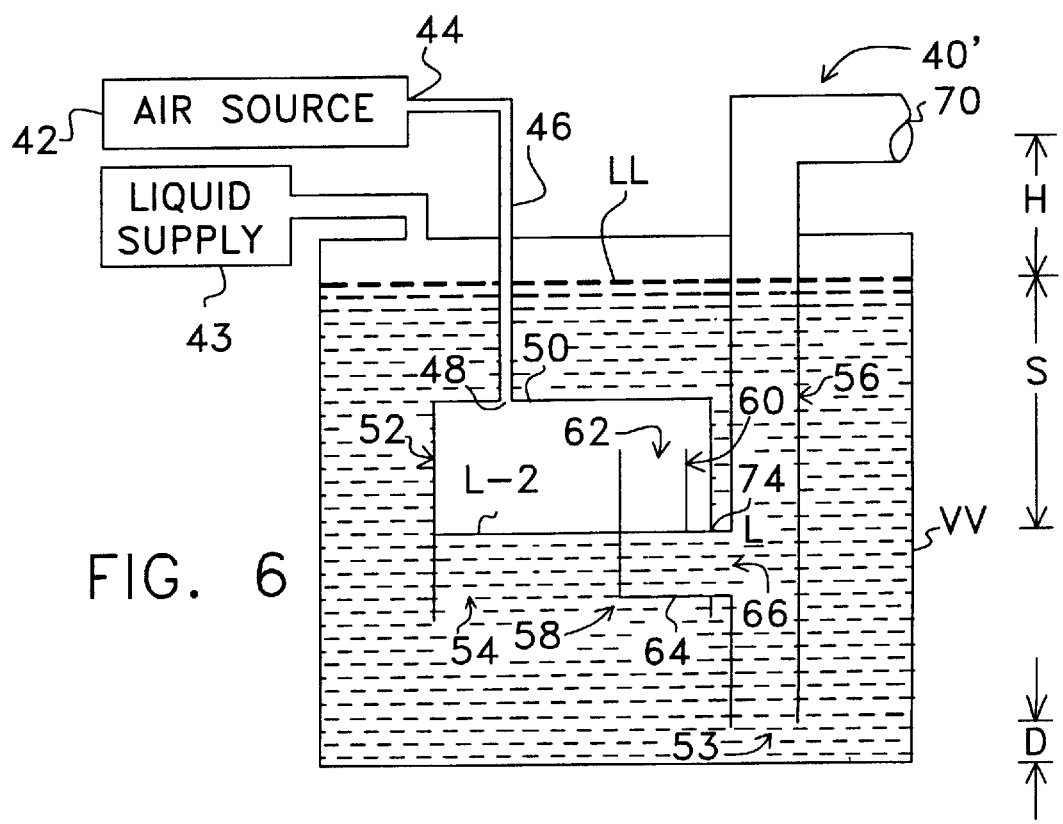
FIG. 6 is a schematic illustration of the pumping cycle utilizing the FIG. 3 airlift pump embodiment and with the air tank filled with pressurized air ready to be discharged into the riser tube just prior to starting the airlift.

In FIG. 5, there is shown the effect of admitting and storing air in air tank 52 and forcing the liquid L through air tank 52 to move to a level L-1. At this level L-1 stage, the airlift pump of the invention is not discharging liquid through output port 70 In a more advanced stage depicted in FIG. 6, the air emitted into air tank 52 has caused the liquid L within air tank 52 to reach a lower level L-2 at which the air in air tank 52 is shown just prior to being released through the discharge end 64 of elbow 58. Again, at this level L-2 stage, the airlift pump of the invention is not discharging liquid through output port 70.

Figure 7:
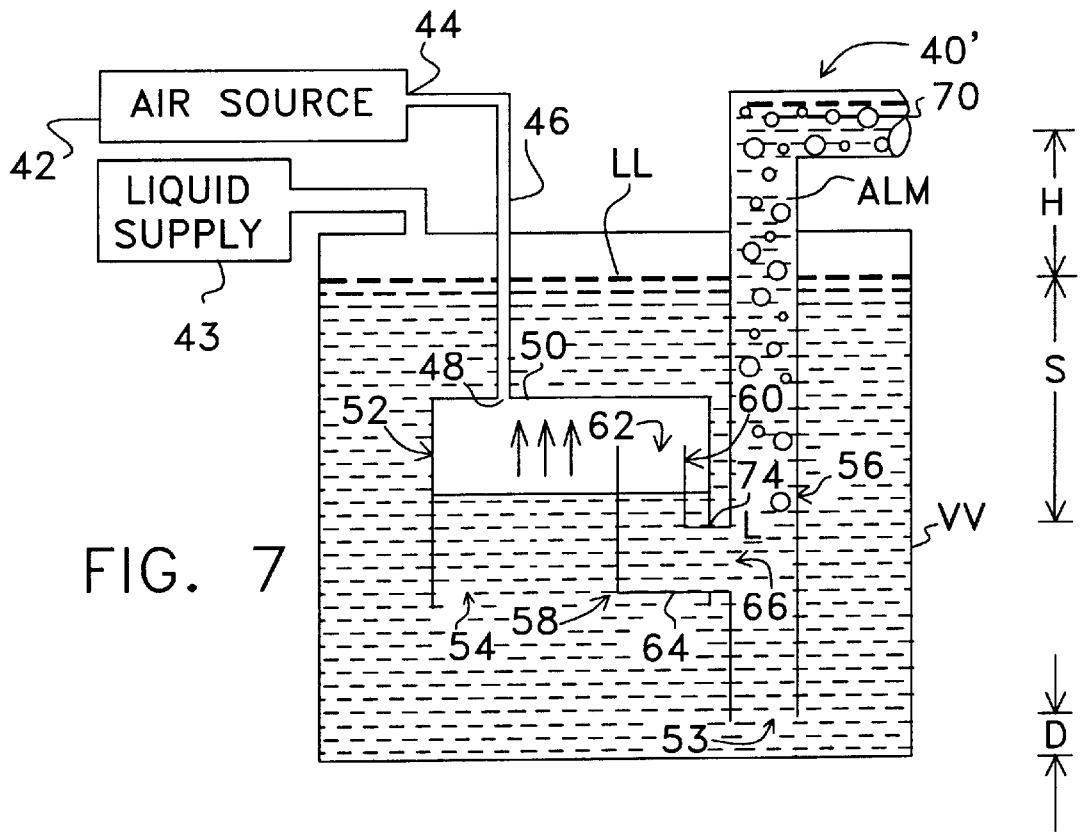
FIG. 7 is a schematic illustration of the airlift portion of the pumping cycle utilizing the FIG. 3 airlift pump embodiment and showing the liquid refilling the air tank.
Figure 8:
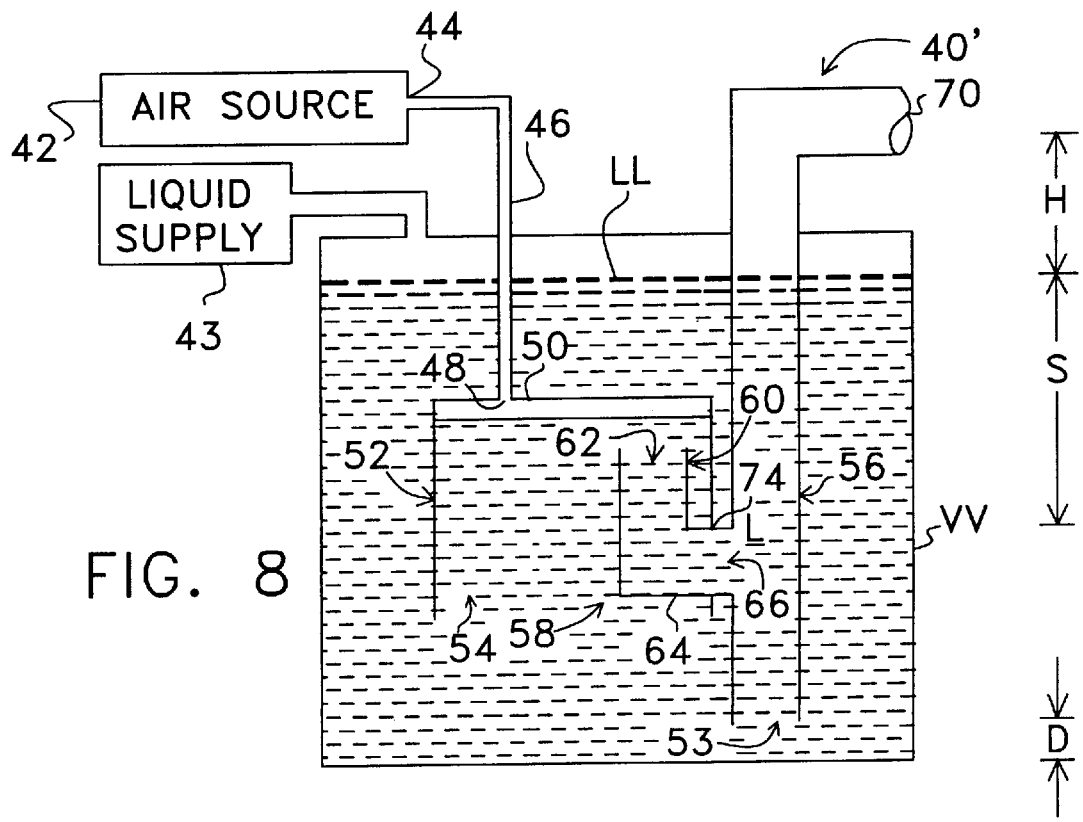
FIG. 8 is a schematic illustration of the portion of the pumping cycle at the end of the airlift utilizing the FIG. 3 airlift pump embodiment.

In the next stage shown in FIG. 7, the stored pressurized air from air tank 52 is assumed to have been released into airlift riser tube 56 along with such liquid as was stored in discharge end 64 of elbow 58 so as to form the air-liquid mix ALM which because of its reduced density, is indicated in FIG. 7 as rising and liquid drawn through intake port 53 is indicated being pumped through output port 70 for discharge to a drain field or other location (not shown). The amount of air-liquid mix ALM contained in each intermittent discharge burst of the present invention is significantly larger and more powerful than the air-liquid mix ALM output of a typical airlift apparatus. It has been shown that the large and powerful intermittent air-liquid mix ALM output burst of the present invention tends to dislodge the bioorganisms from the inside surface of the riser tube 56 and its output port 70 as well from the inside surface of any pipe, drain field tile or the like connected directly to the output port 70, thereby preventing clogging of the septic tank system in these areas. FIG. 7 also illustrates the liquid L refilling the air tank 52 and in FIG. 8, the end of the airlift is illustrated preparatory to the beginning of a new cycle.

Figure 9:
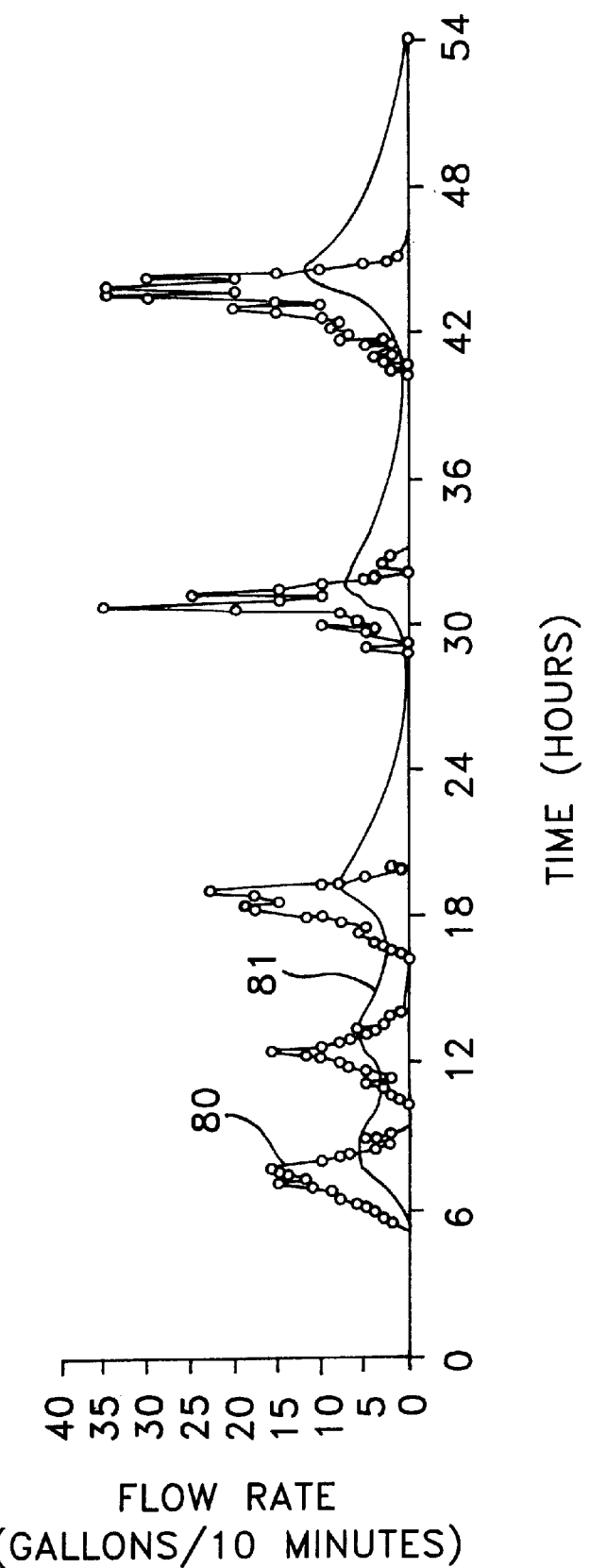
FIG. 9 illustrates the inflow and outflow flow rates of a relatively small size septic tank system utilizing the FIG. 3 airlift pump embodiment.

The source of air 42 is assumed to continuously feed air through air supply line 46. Air source 42 can be a compressed air source, a fan-type air source, or any other air source known in the art. It is also assumed that the liquid L is fed from the appropriate liquid supply 43 to the septic tank or vessel VV intermittently as is common with both household and commercial septic tank systems, and with other liquid collection and transfer systems. As best illustrated in FIG. 9 based on use of the invention apparatus in a typical household septic tank system, the overall result from using the improved airlift system of the invention is that even though in the example being used for illustration, the inflow to the septic tank or vessel VV varies as indicated by representative curve 80, the discharge from the vessel VV by reason of being intermittent tends to be more regular as indicated by representative curve 81. In other words, the airlift of the present invention prevents the septic tank system from tending toward a 1:1 ratio of liquid input to output as shown by FIG. 9. Thus, the invention apparatus and method causes the input wastewater to reside in vessel VV for some amount of time prior to being discharged through port 70. This residence time of the wastewater in vessel VV of the present invention thus allows for more thorough digestion and treatment of the wastewater while within the septic tank prior to going into the drain field. Further, as indicated by curve 81 in FIG. 9, there is achieved a substantially equal output flow over time.

Variations in the head distance H, submerged distance S and intake distance D have all been found to affect the manner in which the invention system operates. However, so long as the operating conditions are such as to make the supply of liquid L available to intermittently fill and replenish air tank 52, the numerous advantages of the invention are obtained in that the liquid is pumped intermittently, is aerated and caused to enter the drain field intermittently and thereby enhance the absorption of the liquid by the soil.

It has also been found that with the intermittent mode of operation, less energy is required to operate an airlift system made according to the invention as compared to an airlift system constructed according to the prior art such as shown in FIG. 1, when both the prior art system and the invention system such as shown in FIG. 3 are assumed to have the same pressurized air source, the same 1-inch size riser tube and the same dimensions H, S and D. The following table illustrates that the airlift pump of the present invention, whose air tank was formed of 4-inch pipe, had a rate of output which was greater than the typical airlift pump operating under the same conditions.

| | Ss [mm] | H [mm] | Ss/(Ss + H) | Flow [1/min] | Air Flow [1/min] | W [W/min] | Wa [W/min] | Efficiency W/Wa |
|---|---|---|---|---|---|---|---|---|
| Invention Air-Lift Pump | 254 | 616 | 29.2% | 0.00 | 7.84 | 0.000 | 0.332 | 0.0% |
| | 305 | 565 | 35.1% | 0.17 | 7.36 | 0.015 | 0.373 | 4.1% |
| | 356 | 514 | 40.9% | 0.85 | 6.89 | 0.072 | 0.407 | 17.6% |
| | 406 | 464 | 46.7% | 2.58 | 6.63 | 0.196 | 0.445 | 44.0% |
| | 457 | 413 | 52.5% | 3.39 | 6.37 | 0.229 | 0.481 | 47.6% |
| | 508 | 362 | 58.4% | 3.93 | 6.11 | 0.233 | 0.512 | 45.5% |
| | 559 | 311 | 54.3% | 4.67 | 5.86 | 0.237 | 0.538 | 44.1% |
| | 610 | 260 | 70.1% | 5.36 | 5.60 | 0.228 | 0.560 | 40.7% |
| Typical Airlift | 457 | 413 | 52.6% | 0.00 | 6.37 | 0.000 | 0.481 | 0.0% |
| | 508 | 362 | 58.4% | 0.37 | 6.11 | 0.022 | 0.512 | 4.3% |

Table Comparing Prior Art And Invention Airlift Pumps

-continued

Table Comparing Prior Art And Invention Airlift Pumps

|  | Ss [mm] | H [mm] | Ss/(Ss + H) | Flow [1/min] | Air Flow [1/min] | W [W/min] | Wa [W/min] | Efficiency W/Wa |
|---|---|---|---|---|---|---|---|---|
| Pump | 559 | 311 | 64.2% | 2.14 | 5.86 | 0.109 | 0.538 | 20.3% |
|  | 610 | 260 | 70.1% | 2.90 | 5.61 | 0.124 | 0.560 | 22.1% |

Ss: Submerged distance [mm]
H: Head distance [mm]
Ss/(Ss + H): Submergence Ratio
Flow: Rate of water discharge [1/min]
Air Flow: Air supplied to the pump at the submergence [1/min]
W: Work done by lifting water per unit time [W/min] in watts
Wa: Work done per unit time by the air in expanding isothermally [W/min] in watts
W/Wa: Efficiency of the pump The table shows in one example that when Ss=610, H=260, and airflow approximately 5.60 liters/minute, the airlift pump of the invention has a liquid flow rate of 5.36 liters/minute and an efficiency of 40.7%. The submerged distance Ss in the table is equivalent to the distance represented by the letter S of FIGS. 1–8. In significant contrast, under the same same conditions, the comparable prior art airlift pump has a liquid flow rate of 2.90 liters/minute and an efficiency of 22.1%. As stated above, an increased rate of air-liquid mix ALM output as provided by the present invention means that the power needed to pump a specified volume of air into the airlift pump of the invention for a specified liquid output is lower. Thus, when using the airlift pump of the present invention for massive airlift pumping applications, such as removal of liquid from the ocean floor or from deep wells, the size and cost of the pressurized air source needed for massive airlift pumping applications is significantly reduced. The increase in pumping efficiency of the present invention also has a significant impact on smaller pumping applications as well, such as in the above described septic tank wastewater system.

In summary, it will be seen that the airlift pumping apparatus and method of the invention provides a unique and advantageous intermittent operation which leads to improvement in pumping efficiency, to improved aeration of the liquid being pumped, to a more equal and uniform outflow in those systems in which the inflow fluctuates, and to a reduction in bioorganism growth particularly when applied to septic tank systems.

While the invention has thus been described with specific embodiments thereof, it will be appreciated that numerous variations, modifications, and embodiments are to be regarded as being within the spirit and scope of the invention.

What is claimed is:

1. A liquid collection and transfer system comprising:
   a) a vessel for receiving and storing a quantity of liquid;
   b) a liquid supply connected to supply said liquid to said vessel;
   c) an airlift pump apparatus mounted in said vessel and operative in response to a supply of pressurized air from an air source connected thereto to store and intermittently release pressurized air and utilize the released pressurized air to intermittently airlift quantities of said liquid from said vessel; and
   d) said airlift pump apparatus is characterized by having:
      i) first means for storing air obtained from said air source;
      ii) second means associated with said first means for intermittently releasing said stored air; and
      iii) a vertical riser tube having an intake port submerged in said reservoir of liquid and an output port located outside the liquid in said reservoir and being connected for receiving said stored air intermittently release d by said second means and airlifting the liquid through said tube for discharge.

2. A liquid collection and transfer system as claimed in claim 1 wherein:
   a) said first means comprises a hollow vertically positioned chamber submerged in said liquid in said vessel and having:
      i) a closed upper end formed with an aperture for passage of said pressurized air;
      ii) an open bottom end; and
      iii) a side wall extending between said upper and bottom ends;
   b) said second means is integrally formed with said riser tube and comprises a second tube connected at one lower horizontal end portion to said riser tube and an open vertical upper end portion terminating within said chamber below said chamber upper end; and
   c) said vertical riser tube has an open lower end portion extending into the liquid within said vessel and below the level at which said second tube lower horizontal end portion is connected to said riser tube.

3. A liquid collection and transfer system as claimed in claim 2 wherein said riser tube is mounted so as to extend through said chamber closed upper end.

4. A liquid collection and transfer system as claimed in claim 2 wherein said riser tube is mounted externally of said chamber and said second tube lower horizontal end portion is mounted to extend through said chamber side wall.

5. A liquid collection and transfer system as claimed in claim 1 wherein:
   a) said vessel comprises a component of a septic tank system; and
   b) said liquid supply comprises a source of intermittently discharged wastewater.

6. An airlift pump apparatus as claimed in claim 1, wherein said first means comprises an air tank having a closed upper end and an opening that is lower than the surface of said liquid and being mounted in said vessel in a manner to enclose said laterally disposed discharge port.

7. An airlift pump apparatus as claimed in claim 1, wherein said second means comprises a branch tube having an upwardly facing intake port thereof residing within said air tank, said branch tube being connected to said riser tube above the lower end thereof.

8. An airlift pump apparatus for intermittent removal of liquid from a reservoir of liquid forming part of a liquid collection and reservoir system, comprising:

a) a riser tube having an intake port submerged in said reservoir of liquid and an output port located outside of the liquid in said reservoir;

b) said riser tube further having a laterally disposed branch tube with an upwardly facing intake port of said branch tube residing within said reservoir at a level between said intake port of said riser tube and the surface of said liquid;

c) an air tank having a closed upper end and an opening that is lower than said intake port of said branch tube and being mounted in said vessel in a manner to enclose said laterally disposed branch tube; and d) an air source connected to supply pressurized air to said air tank.

9. An airlift pump apparatus as claimed in claim 8, wherein said branch tube is formed as an elbow.

10. An airlift pump apparatus for use with a liquid collection and transfer system comprising:

a) air storage means adapted to be submerged in a liquid, be substantially filled with said liquid and thereafter in response to air being admitted to said air storage means to gradually force the uppermost level of liquid within said storage means downwardly to a predetermined lower level;

b) a riser tube having intake and discharge portions, said intake portion being positioned to receive said stored air when said liquid reaches said lower level and in operative association with said discharge portion being partially submerged in said liquid to receive and utilize said air to airlift liquid from said vessel to be discharged at a higher level above the level of liquid in said vessel; and c) wherein said liquid discharged at said higher level is done so intermittently by the respective filling and emptying of liquid into and from said air storage means.

11. A method of pumping a liquid by airlift in a liquid collection and storage system, comprising:

a) injecting air into an inverted air tank positioned within a liquid reservoir below the liquid surface thereof and allowing the injected air to accumulate in the air tank;

b) intermittently allowing at least a portion of the accumulated injected air in said air tank to burst from the air tank into a riser tube at a location above a bottom open end of said tube submerged in the liquid to be pumped;

c) utilizing said intermittently burst air to create intermittent powerful airlifts of said liquid within said riser tube to dislodge bioorganisms therefrom; and d) discharging airlifted liquid from said riser tube.

* * * * *

UNITED STATES PATENT AND TRADEMARK OFFICE
CERTIFICATE OF CORRECTION

PATENT NO.   : 6,162,020
DATED        : December 19, 2000
INVENTOR(S)  : Masao Kondo It is certified that error appears in the above-identified patent and that said Letters Patent is hereby corrected as shown below:

Column 2, line 52, "with" should read --within--.  (PTO error, see Amendment of 6/5/00)

Column 5, line 16, after "70", insert a period.  (PTO error)

In claim 1, subparagraph (iii), line 5, "release d" should read --released--.  (PTO error)

Signed and Sealed this

Twenty-ninth Day of May, 2001

Attest:

NICHOLAS P. GODICI

*Attesting Officer*    *Acting Director of the United States Patent and Trademark Office*